Oct. 9, 1962   H. D. BERKSON   3,057,142
LAWN CLIPPING DEVICE
Filed Jan. 20, 1960   2 Sheets-Sheet 1

INVENTOR.
Herbert D. Berkson
BY Harold E. Cole
Attorney

Oct. 9, 1962 H. D. BERKSON 3,057,142
LAWN CLIPPING DEVICE
Filed Jan. 20, 1960 2 Sheets-Sheet 2
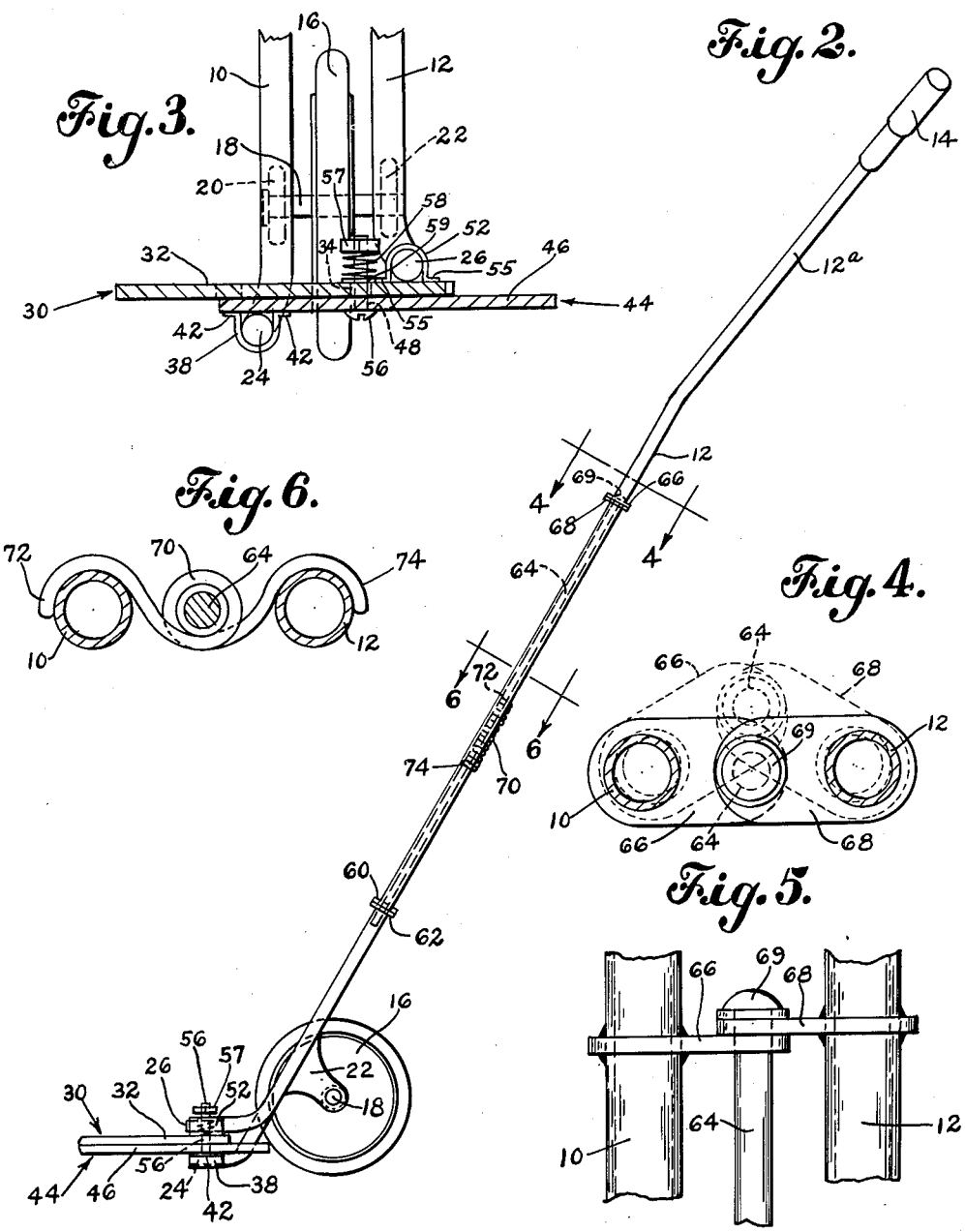
INVENTOR.
Herbert D. Berkson
BY Harold E. Cole
Attorney

United States Patent Office 3,057,142
Patented Oct. 9, 1962

3,057,142
LAWN CLIPPING DEVICE
Herbert D. Berkson, Boston, Mass., assignor, by direct and mesne assignments, of forty-five percent to Robert F. Muse, Brookline, Mass., and ten percent to Ralph W. Johnson, Jr., Peterborough, N.H.
Filed Jan. 20, 1960, Ser. No. 3,578
9 Claims. (Cl. 56—241)

This invention relates to a lawn clipping device having a plurality of pairs of cutting blades.

One object of my invention is to provide a clipping device which is easy and convenient to operate and has a plurality of pairs of cutting blades so that a plurality of openings between blades are provided to receive grass, weeds or the like to be clipped, thus doing an unusual amount of clipping at each operating movement of the handles.

Another object is to provide a clipping device that is supported by a wheel that is moved along the ground whereby the operator's energy in progressively clipping a plot can be devoted almost entirely to operating the handles by eliminating the need for lifting the device from one place to another.

A further object is to provide a clipping device that has a minimum number of parts that can be produced and assembled economically, thus keeping the selling price of my device within the range of the ordinary family.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings, nor to the particular parts described in the specification; but am entitled to all such changes therefrom as fall within the scope of my claims.

In the drawings:

FIG. 2 is a side elevational view of said device.

FIG. 3 is an enlarged, fragmentary sectional view taken on the line 3—3 of FIG. 1.

FIG. 4 is an enlarged, sectional view taken on the line 4—4 of FIG. 2, the dash lines indicating changed positions of the rod and links connected to the handles.

FIG. 5 is a fragmentary, side elevational view of that part of the mechanism shown in FIG. 4.

FIG. 6 is an enlarged sectional view taken on the line 6—6 of FIG. 2.

Figure 1:
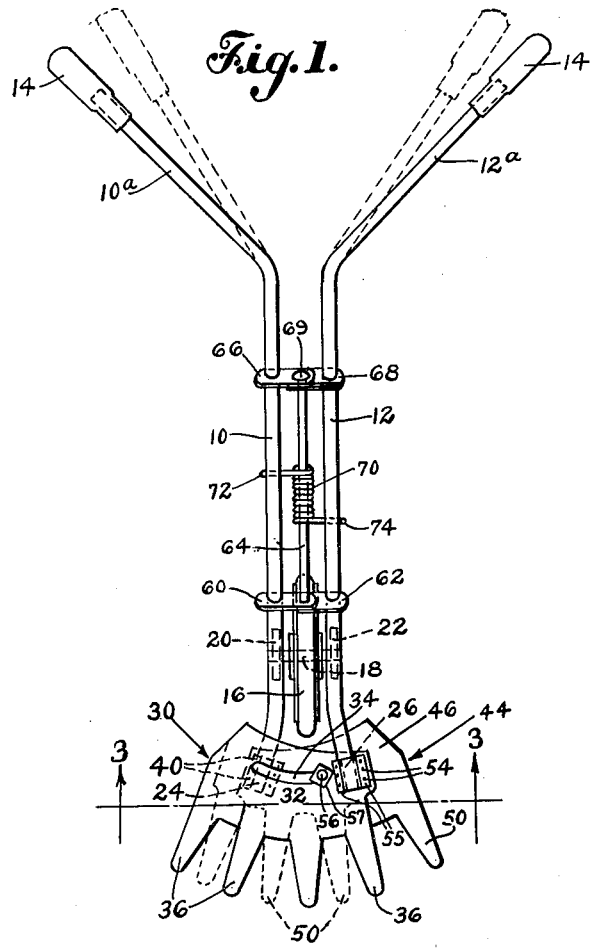
FIG. 1 is a top plan view of my lawn clipping device, the dash lines indicating position of the handles when operated during the cutting movement, and also a changed position of blades due to said movement.

As illustrated, the main support for my lawn clipping device has two hand handles 10 and 12 each having outer diagonal hand portions 10a and 12a respectively which normally extend outwardly away from each other, and on the ends thereof are finger grips 14. For convenience and support I provide a wheel 16 for my device to travel upon which is rotatably mounted on a shaft 18 and is loosely set in supporting lugs 20 and 22 attached to said handles 10 and 12 respectively. Each handle has an angular attaching portion 24 and 26 respectively, at its lower or outer end, later explained.

An upper cutter 30 has a body portion 32 having an elongate, arcuate slot 34 therethrough and a plurality of forwardly extending shearing blades 36 (four being shown), spaced laterally apart. Said angular attaching portion 24 of handle 10 is connected to said lower cutter body 44 near a side edge thereof by extending into a sleeve holder 38 which is held upon said body 44 by rivets 40 extending through the sleeve holder opposite sides 42 into said body 44.

A lower cutter 44 has a body portion 46 having a hole 48 therethrough and a plurality of forwardly extending shearing blades 50, similar to blades 36, spaced laterally apart. Said handle angular attaching portion 26 is connected to said upper cutter body 32 near a side edge thereof by extending into a sleeve holder 52 that is held to, and over, said body 32, by rivets 54 that extend through a pair of opposite sides 55 of said sleeve holder 52.

A bolt or other pin member 56 extends through said lower cutter body 46 and movably through said upper cutter slot 34, being held in position by a nut 57 bearing against a coil spring 58 which in turn bears against a washer 59 next to said upper cutter body 32.

Said upper cutter 30 slides laterally on and beyond one side of said lower cutter 44 in response to movement inwardly of said handle 10, while said lower cutter 44 slides laterally on and beyond one side of said upper cutter 30 in response to movement inwardly of said handle 12, thus providing shearing movement in both directions simultaneously.

Slightly above said wheel 16 is a link 60 fixedly attached to and extending inwardly from said handle 10. Laterally opposite said link 60 is another ink 62 fixedy attached to handle 12 and extending inwardly towards said link 60. Said links 60 and 62 overlap each other and an elongate rod 64 extends through holes in the overlapping portions thereof which latter are free to rotate about said rod 64.

Considerably above said links 60 and 62 are two similar links 66 and 68 fixedly attached to and extending inwardly from said handle 10 and 12 respectively and which overlap each other. Said elongate rod 64 extends through the overlapping portions thereof which latter are free to rotate about said rod 64. The latter has a retaining head 69 just above said links 66 and 68.

A coil spring 70 freely extends around said rod 64 between the said links 60 and 66 and one end 72 bears against said handle 10 while the other end 74 bears against said handle 12. Movement of either, or both, said handles 10 and 12 inwardly tightens said spring 70, and also moves said cutters 30 and 44 in opposite directions in a shearing action, as previously explained. Upon release of said handles said spring 70 automatically causes their return to normal position.

I claim:

1. A lawn clipping device comprising two handles, two cutters in sliding relationship to each other, means movably connecting said cutters, means attaching said cutters to said handles, a shaft above said cutters supported by and between said handles, a wheel rotatably mounted on said shaft between said handles and positioned to support said device in position of use.

2. A lawn clipping device comprising two handles, two cutters in sliding relationship to each other, means movably connecting said cutters, two sleeve holders attached to said cutters, said handles extending into said holders, a shaft above said cutters supported by and between said handles, a wheel rotatably mounted on said shaft between said handles and positioned to support said device in position of use.

3. A lawn clipping device comprising two handles, two cutters in sliding relationship to each other, means movably connecting said cutters, two sleeve holders attached to said cutters, said handles embodying angularly extending portions extending into said holders, a shaft above said cutter supported by and between said handles, a wheel rotatably mounted on said shaft between said handles and positioned to support said device in position of use.

4. A lawn clipping device comprising two handles, two cutters in sliding relationship to each other, one said cutter having a slot therein, a pin member extending through said slot and into the other said cutter to movably hold said cutters together, means attaching said cutters to said handles, a shaft supported by and between said handles, a wheel rotatably mounted on said shaft between said handles and extending from below to above said cutters in position to support said device in position of use.

5. A lawn clipping device comprising two handles, two cutters in silding relationship to each other, one said cutter having a slot therein, a pin member extending through said slot and into the other said cutter to movably hold said cutters together, means attaching said cutters to said handles, a supporting wheel extending from below to above said cutters, two pairs of links fixedly mounted on said handles spaced apart, the links of each said pair overlapping each other and having holes therethrough, a rod freely extending through said holes in both said pairs, and a coil spring around said rod embodying ends which bear against said handles, said coil spring being adapted to be placed under tension when said handles are operated.

6. A lawn clipping device comprising two handles each embodying an angular hand portion, two cutters in sliding relationship to each other, one said cutter having a slot therein, a pin member extending through said slot and into the other said cutter to movably hold said cutters together, means attaching said cutters to said handles, a shaft supported by and between said handles, a wheel rotatably mounted on said shaft between said handles and extending from below to above said cutters to support said device in position of use, two pairs of links fixedly mounted on said handles spaced apart, the links of each said pair overlapping each other and having holes therethrough, a rod freely extending through said holes in both said pairs, and a coil spring around said rod embodying ends which bear against said handles, said coil spring being adapted to be placed under tension when said handles are operated, said rod extending and terminating, between said wheel and said handle hand portions.

7. A lawn clipping device comprising two handles, two cutters in sliding relationship to each other, means movably connecting said cutters, means attaching said handles to said cutters, a shaft supported by and between said handles, a wheel rotatably mounted on said shaft between said handles and extending from below to above said cutters to support said device in position of use, two pairs of links fixedly mounted on said handles spaced apart, the links of each said pair overlapping each other and having holes therethrough, a rod freely extending through said holes in both said pairs, and a coil spring around said rod embodying ends which bear against said handles, said coil spring being adapted to be placed under tension when said handles are operated, said rod extending and terminating between said wheel and said handle portions.

8. A lawn clipping device comprising two handles each embodying an angular hand portion, two cutters in sliding relationship to each other, one said cutter having a slot therein, a pin member extending through said slot and into the other said cutter to movably hold said cutters together, two sleeve holders attached to said cutters, said handles embodying angularly extending attaching portions extending into said holders, a shaft supported by and between said handles, a wheel rotatably mounted on said shaft between said handles and extending from below to above said cutters to support said device in position of use, two pairs of links fixedly mounted on said handles spaced apart, the links of each said pair overlapping each other and having holes therethrough, a rod freely extending through said holes in both said pairs, and a coil spring around said rod embodying ends which bear against said handles, said coil spring being adapted to be placed under tension when said handles are operated, said rod extending and terminating between said wheel and said handle portions.

9. A lawn clipping device comprising two handles each embodying an angular hand portion and two lugs, two cutters in sliding relationship to each other, one said cutter having a slot therein, a pin member extending through said slot and into the other said cutter to movably hold said cutters together, two sleeve holders attached to said cutters, said handles embodying angularly extending portions extending into said holders, a shaft supported by and between said lugs, a wheel rotatably mounted on said shaft between said handles and extending from below to above said cutters to support said device in position of use, two pairs of links fixedly mounted on said handles spaced apart, the links of each said pair overlapping each other and having holes therethrough, a rod freely extending through said holes in both said pairs, and a coil spring around said rod embodying ends which bear against said handles, said coil spring being adapted to be placed under tension when said handles are operated, said rod extending and terminating between said wheel and said handle portions.

References Cited in the file of this patent
UNITED STATES PATENTS

| | | |
|---|---|---|
| 912,408 | Place | Feb. 16, 1909 |
| 966,108 | Mahood | Aug. 2, 1910 |
| 1,072,151 | Norcross | Sept. 2, 1913 |